Oct. 15, 1929.  E. J. TJERNLUND  1,731,954
CALIPERS
Filed Dec. 12, 1927
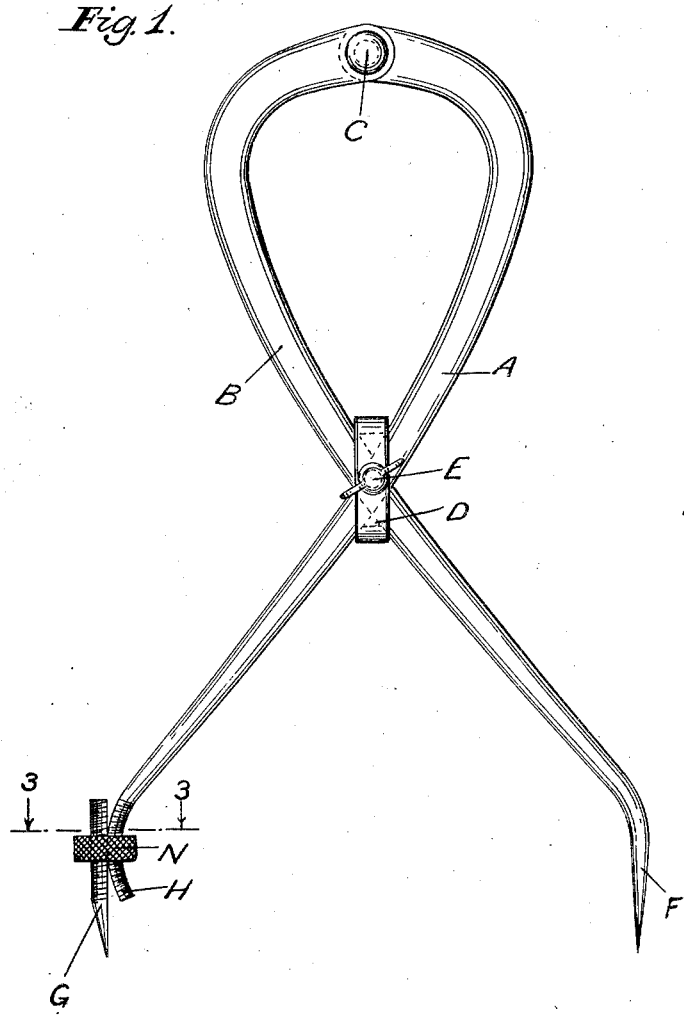
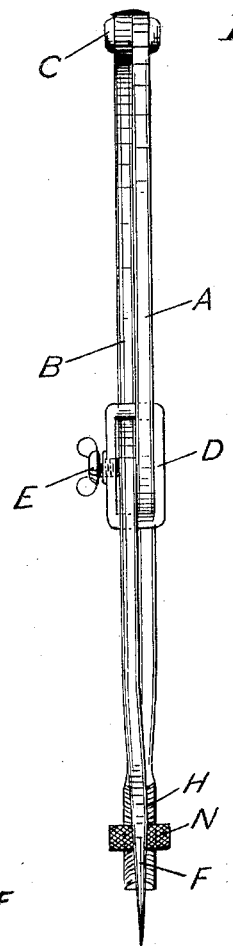
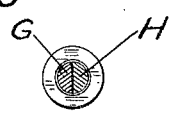
INVENTOR
EMIL J. TJERNLUND
BY
ATTORNEY Patented Oct. 15, 1929

1,731,954

UNITED STATES PATENT OFFICE

EMIL J. TJERNLUND, OF ST. PAUL, MINNESOTA

CALIPERS

Application filed December 12, 1927. Serial No. 239,561.

This invention relates to scientific or measuring instruments and the primary object is to provide a simple, efficient and practical instrument in the nature of a calipers or dividers, in which two pivotally connected arms have end fingers or points which are relatively adjustable, for the purpose of measuring and transposing measurements, or which may also be employed, as a compass, to transcribe circles, arcs, and the like, as is customary with instruments of this type. A further object is to provide means, of a novel nature, for adjustably securing the legs together, whereby the points will be held rigid with respect to each other. A further object is to provide an improved secondary adjusting means, whereby a gradual and finer adjustment may be affected to one of the points without disturbing the primary or leg adjusting means proper. Still further and more specific objects will be disclosed in the course of the following specification, reference being had to the accompanying drawing, in which:

Fig. 1 is a plan elevation of the device.

Fig. 2 is a side or edge elevation of the device as shown in Fig. 1.

Fig. 3 is a detail sectional view on the line 3—3 in Fig. 1.

Referring to the drawing more particularly and by reference characters, A and B designate a pair of crossed lever legs, the inwardly curved upper ends of which are connected by a pivot member C. A link or clip D loosely receives the legs, where they later cross each other, and is provided with a set screw E, which, when tightened, will clamp the legs rigidly against each other. When the screw is loosened the link D may be moved up and down depending upon the span effected between the operating points. The relatively sharp inward curves at the upper ends of the legs permit them to slide in the link until the latter is very close to the pivot, and thus permits the legs to be spread over a very wide span.

To bring the operating points relatively close together, it is necessary that the link D be moved far down on the legs, and as the rigidity of the legs depends on the set screw and link it will be seen that the points will be very rigid when operating in small dimensions at which time relative rigidity is most desired, as the points will not be subjected to the flexibility of the legs above the clip position. It will be noted that the integral point or finger F, of the leg B, and the adjustable point G, of the leg A, are directed inwardly from the general directions of their respective legs. This is done for two reasons. In the first place, it permits the points to come very close together, when the link is in its lowermost position, and, secondly, it permits the points to operate at a substantial working angle to a surface worked on, when the legs are spread out in wide angles. This is of particular benefit in outside calipers and dividers. On the other hand it will be understood that if the device is to be used as an inside caliper, it will be necessary to angle the points outwardly, instead of inwardly as shown in Fig. 1.

In order to provide a relatively fine, or more accurate, adjustment between the points F and G, I mount the latter as follows:

The lower end of the leg A is formed with an arcuately curved end section H, the same being semi-circular in cross section (Fig. 3), and being provided about its inner or curved surface with threads. The point or finger G is straight but is also semi-circular in cross section, with its outer surface threaded to complement the threads of H. A knurled nut N is threaded upon the members G—H and securely holds them together, and yet is movable, up and down, by turning, and when so turned, will affect a tilting adjustment of the finger on the leg section.

It is understood that suitable modifications may be made in the general design and structural details of the invention as herein shown and described, provided, however, that such modifications come within the spirit and scope of the appended claims.

Having now therefore fully shown and described my invention, what I claim to be new and desire to protect by Letters Patent is:

1. A device of the character described comprising a pair of pivotally connected legs crossing at a point removed from the pivot, and means encircling and slidably carried by the legs for securing them rigidly together at their point of intersection.

2. A device of the character described comprising a pair of legs pivotally connected at their upper ends and having operating points at their opposite ends, said legs crossing each other intermediate their ends, and releasable means slidably contacting with the outer edges of and for rigidly connecting the legs together at their point of intersection.

3. A device of the character described comprising a pair of legs pivotally connected at their upper ends and having operating points at their opposite ends, said legs crossing each other intermediate their ends and releasable means for rigidly connecting the legs together at their point of intersection, said means comprising a vertically disposed link member slidably encircling the legs, and a fastening device for releasably securing the link member and legs together.

4. A device of the character described comprising a pair of crossed legs having operating points at their lower ends, and having their upper end portions curved inwardly and connected by a pivot, and a fastening device slidably encircling the legs, at their point of intersection, and movable up and down thereon as the operating points are spread apart and brought together.

5. In a caliper or the like, spreadable legs with operating fingers at the extremities thereof, means for securing the legs in adjusted positions with respect to each other, one of said legs having a curved, threaded section to rockably receive the operating finger thereof, said finger having threads to complement the threads of said section, and a screw member adjustably mounted on said threaded leg section and finger.

6. In a device of the class described, a longitudinally curved leg section that is substantially semi-circular in cross section, an operating finger mounted for rocking movement on said curved leg section, and an adjusting member threaded to screw on said leg section and finger to hold them together, and to gradually effect said rocking movement.

In testimony whereof I affix my signature.

EMIL J. TJERNLUND.